(12) United States Patent
Resconi et al.

(10) Patent No.: US 7,799,722 B2
(45) Date of Patent: Sep. 21, 2010

(54) CATALYST SYSTEM FOR THE POLYMERIZATION OF OLEFIN

(75) Inventors: Luigi Resconi, Ferrara (IT); Gilberto Moscardi, Ferrara (IT); Anna Fait, Ferrara (IT)

(73) Assignee: Basell Polyolefine GmbH, Wesseling (DE)

(*) Notice: Subject to any disclaimer, the term of this patent is extended or adjusted under 35 U.S.C. 154(b) by 246 days.

(21) Appl. No.: 10/592,565

(22) PCT Filed: Mar. 8, 2005

(86) PCT No.: PCT/EP2005/002479

§ 371 (c)(1),
(2), (4) Date: Jul. 18, 2008

(87) PCT Pub. No.: WO2005/095468

PCT Pub. Date: Oct. 13, 2005

(65) Prior Publication Data

US 2008/0281062 A1    Nov. 13, 2008

Related U.S. Application Data

(60) Provisional application No. 60/554,110, filed on Mar. 17, 2004.

(30) Foreign Application Priority Data

Mar. 12, 2004 (EP) .................... 04101020

(51) Int. Cl.
*C08F 4/602* (2006.01)
*C08F 4/606* (2006.01)
*C08F 4/6192* (2006.01)
*B01J 31/14* (2006.01)
*B01J 31/22* (2006.01)

(52) U.S. Cl. .................. 502/114; 502/103; 502/104; 502/152; 526/160; 526/165; 526/943

(58) Field of Classification Search ............... 502/103, 502/104, 114, 152; 526/160, 165, 943
See application file for complete search history.

(56) References Cited

U.S. PATENT DOCUMENTS

| | | | |
|---|---|---|---|
| 5,043,515 A | 8/1991 | Slaugh et al. | |
| 5,066,631 A | 11/1991 | Sangokoya et al. | |
| 5,145,819 A | 9/1992 | Winter et al. | |
| 5,239,022 A | 8/1993 | Winter et al. | |
| 5,243,001 A | 9/1993 | Winter et al. | |
| 5,324,800 A | 6/1994 | Welborn, Jr. et al. | |
| 5,556,928 A | 9/1996 | Devore et al. | |
| 5,847,177 A | 12/1998 | Sangokoya et al. | |
| RE37,384 E | 9/2001 | Winter et al. | |
| 6,444,607 B1 | 9/2002 | Gonioukh et al. | |
| 6,664,208 B1 | 12/2003 | Fujita et al. | |
| 7,101,940 B2 | 9/2006 | Schottek et al. | |

FOREIGN PATENT DOCUMENTS

| | | |
|---|---|---|
| CA | 2220243 | 9/1997 |
| EP | 129368 | 12/1984 |
| EP | 172961 | 3/1986 |
| EP | 480390 | 4/1992 |
| EP | 485820 | 5/1992 |
| EP | 485822 | 5/1992 |
| EP | 485823 | 5/1992 |
| WO | 96/22995 | 8/1996 |
| WO | 98/18801 | 5/1998 |
| WO | 98/22486 | 5/1998 |
| WO | 99/21899 | 5/1999 |
| WO | 99/24446 | 5/1999 |
| WO | 99/58539 | 11/1999 |
| WO | 01/21674 | 3/2001 |
| WO | 01/44318 | 6/2001 |
| WO | 01/47939 | 7/2001 |
| WO | 03/045964 | 6/2003 |

*Primary Examiner*—Caixia Lu
(74) *Attorney, Agent, or Firm*—William R. Reid

(57) ABSTRACT

A catalyst system solution obtainable by a process comprising the following steps:
(a) contacting a solution of methylalumoxane in an aromatic solvent (solvent a) with a solution of one or more organo-aluminium in a solvent (solvent b), or a solution of one or more alumoxanes different from methylalumoxane in a solvent (solvent b);
(b) when solvent b) is an aromatic solvent or if solvent b) has a boiling point lower than solvent a) add to the solution formed in step a) an alifatic solvent (solvent c) having a boiling point higher than solvent a) and solvent b); or
(c) solubilizing a metallocene compound in the solution obtained in step a) or in step b); and
(d) substantially removing solvent a) or solvent a) and solvent b) from the solution.

17 Claims, No Drawings

CATALYST SYSTEM FOR THE POLYMERIZATION OF OLEFIN

This application is the U.S. national phase of International Application PCT/EP2005/002479, filed Mar. 8, 2005, claiming priority to European Patent Application 04101020.8 filed Mar. 12, 2004, and the benefit under 35 U.S.C. 119(e) of U.S. Provisional Application No. 60/554,110, filed Mar. 17, 2004; the disclosures of International Application PCT/EP2005/002479, European Patent Application 04101020.8 and U.S. Provisional Application No. 60/554,110, each as filed, are incorporated herein by reference.

The present invention relates to a soluble metallocene-based catalyst system useful in slurry and solution polymerization of olefins.

Metallocene compounds are well known catalyst-component for the polymerization of olefins, especially alpha-olefin. Unsupported metallocene-based catalyst systems are prepared by reacting metallocene compounds and alumoxanes in a solvent. The most commonly used activator is methylalumoxane in toluene solution. Main drawbacks of MAO are its relatively high cost, and the large amount needed (typically, $Al/Zr=10^2-10^4$ molar are used). Moreover, from the standpoints of polymer applications (for example, in view of possible food applications of the final polymer) and process waste and recycle management, the presence of toluene should be avoided or reduced as much as possible, because of issues related to its toxicity.

CA 2200243 solves the problem of the use of toluene by adding to a toluene solution of methylalumoxane (MAO) a paraffin and then distilling off the toluene. Even if toluene was removed, in the resulting mixture MAO is not solubilized but is present as a suspension, as shown in the examples. In U.S. Pat. No. 6,444,607 a catalyst solution for polymerizing alpha-olefin is obtained by reacting a metallocene compound with an activator, adding one or more alpha-olefins and mixing with at least 10 parts by volume of an alifatic hydrocarbon. The solubility of the cationically activated metallocene compound is in this way increased by reaction with one or more alpha olefins.

The applicant has found a new process for the preparation of a soluble catalyst system with a reduced toluene content and that allows to obtain polymers of higher molecular weight (as shown for example by its intrinsic viscosity value, I.V.), compared to those achievable by MAO/toluene-activated metallocenes. Moreover, the catalyst system obtained with this procedure shows an improved polymerization productivity, referred to the amount of methylalumoxane employed, and does not suffer from significant loss of activity over time. An object of the present invention is a catalytic solution obtainable by a process comprising the following steps:

(a) contacting a solution of methylalumoxane (MAO) in an aromatic solvent (solvent a) with a solution in a solvent (solvent b) of one or more alumoxanes different from methylalumoxane or one or more organo-aluminium compound of formula $H_jAlU_{3-j}$ or $H_jAl_2U_{6-j}$, where the U substituents, same or different, are hydrogen atoms, halogen atoms, or hydrocarbon groups containing from 2 to 20 carbon atoms, optionally containing silicon or germanium atoms, with the proviso that at least one U is different from halogen and at least at least one U is different from hydrogen, and j ranges from 0 to 1, being also a non-integer number;

(b) when solvent b) is an aromatic solvent or solvent b) has a boiling point lower than solvent a) adding to the solution formed in step a) an alifatic solvent (solvent c) having a boiling point higher than solvent a) and solvent b);

(c) solubilizing a metallocene compound in the solution obtained in step a) or in step b); and (d) substantially removing the aromatic solvent(s) (solvent a) or solvent a) and solvent b). if step b) has been carried out) from the solution.

wherein the content of the aromatic solvent(s) in the solution obtained in step d) is lower than 2% by weight; preferably equal to or lower than 1% by weight; the molar concentration of the metallocene compound in the final solution obtained in step d) ranges from $1 \cdot 10^{-5}$ to $1 \cdot 10^{-1}$ mol/l, and the molar ratio between methylalumoxane and the organo-aluminium compound or the molar ratio between methylalumoxane and the alumoxane used in step b) ranges from 10:1 to 1:10; preferably it ranges from 5:1 to 1:5; more preferably from 3:1 to 1:3.

Methylalumoxane (MAO) used in step a) can be obtained by reacting water with trimethylaluminum. In this reaction the molar ratio of Al/water is preferably comprised between 1:1 and 100:1.

The methylalumoxane used in the catalyst according to the invention is considered to be linear, branched or cyclic compounds containing at least one compound of the formula:

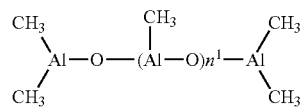

wherein $n^1$ is 0 or an integer of from 1 to 40; or a compound of the formula:

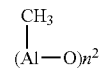

in the case of cyclic compounds, wherein $n^2$ is an integer from 2 to 40.

In the organo-aluminium compound of formula $H_jAlU_{3-j}$ or $H_jAl_2U_{6-j}$, preferably the U substituents, equal to or different from each other, are linear or branched $C_2$-$C_{20}$-alkyl or $C_3$-$C_{20}$-cyclalkyl, radicals. Preferably U is a linear or branched $C_2$-$C_{20}$-alkyl radical; more preferably U is an ethyl, a n-propyl, a iso-propyl, a n-butyl, an iso-butyl, a tert-butyl, a hexyl or an octyl radical;

Preferred organo aluminium compounds are triethylaluminum (TEA), triisobutylaluminum (TIBA), triisohexylaluminum, triisooctylaluminum.

Alumoxanes that can be used in the solution of solvent b) are compounds containing at least one group of the type:

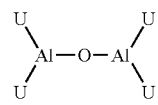

wherein the substituents U, same or different, are hydrogen atoms, halogen atoms, $C_2$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen and from hydrogen atom.

In particular, alumoxanes of the formula:

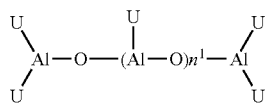

can be used in the case of linear compounds, wherein $n^1$ is 0 or an integer of from 1 to 40 and the substituents U are defined as above; or alumoxanes of the formula:

can be used in the case of cyclic compounds, wherein $n^2$ is an integer from 2 to 40 and the U substituents are defined as above.

They can be obtained by reacting water with alkyl or aryl aluminium compounds. Particularly interesting alumoxanes are those described in WO 99/21899 and in WO01/21674 in which the alkyl and aryl groups have specific branched patterns.

Non-limiting examples of aluminium compounds that can be reacted with water to give suitable alumoxanes are described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Preferred alumoxanes suitable for use according to the present invention are, tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TIMBAO).

Solvent a) that can be used to obtain a solution of methyalumoxane is an aromatic solvent having from 6 to 12 carbon atoms. Preferably benzene, toluene or xylene are used.

According to step a) the organo-aluminum compound or alumoxane different from methylalumoxane is solubilized in solvent b). Suitable solvents are aromatic or alifatic hydrocarbon solvents or mixtures thereof, suitable aromatic solvents have from 6 to 12 carbon atoms such as benzene, toluene or xylene; suitable alifatic solvents have from 5 to 30 carbon atoms such as pentane, heptane, isododecane, isohexadecane, isoeicosane mixtures of alifatic solvents can be used such as ISOPAR® solvent having an average molecular weight ranging from 100 to 200, preferably ranging from 160 to 180 (ISOPAR® L). Preferably solvent b) is an alifatic hydrocarbon having from 8 to 30 carbon atom (and in this case solvent c) is not used); more preferably it is isododecane, decahydronaphthalene and isohexadecane. Preferably solvent b) has a boiling point higher than 110° C.

In the case that solvent b) is an aromatic compound or a mixture of solvents containing an aromatic compound, or solvent b) has a boiling point lower than solvent a), solvent c), according to the process of the present invention, is used. Solvent c) is an alifatic compound or a mixtures of alifatic compounds having a boiling point higher than solvent a) and solvent b). Suitable solvents c) have from 8 to 30 carbon atoms; examples of solvent c) are octane, decane, isododecane, decahydronaphthalene, isohexadecane, isoeicosane ISOPAR®. Preferably solvent c) has a boiling point higher than 110° C.

Preferably the process of the present invention comprises the following steps:

a1) contacting a solution of methylalumoxane in an aromatic solvent (solvent a) with a solution of one or more organoaluminium compound of formula $H_jAlU_{3-j}$ or $H_jAl_2U_{6-j}$ in an alifatic solvent (solvent b) having a boiling point higher than solvent a), where the U substituents, same or different, are hydrogen atoms, halogen atoms, or hydrocarbon groups containing from 2 to 20 carbon atoms, optionally containing silicon or germanium atoms, with the proviso that at least one U is different from halogen and at least one U is different from hydrogen, and j ranges from 0 to 1, being also a non-integer number;

b1) solubilizing a metallocene compound in the solution obtained in step a1); and c1) substantially removing solvent a) from the solution;

wherein the content of solvent a) in the solution obtained in step c1) is lower than 2% by weight; preferably it is equal to or lower than 1% by weight; and the molar concentration of the metallocene compound in the final solution obtained in step c1) ranges from $10^{-5}$ to $10^{-1}$ mol/l, and the molar ratio between methylalumoxane and the organo-aluminium compound ranges from 10:1 to 1:10; preferably it ranges from 5:1 to 1:5; more preferably from 3:1 to 1:3.

For the purpose of the present invention metallocene compounds are compounds having at least one cyclopentadienyl moiety linked trough a n-bond to the central metal atom belonging to group 4, 5 of the Periodic Table of the Elements; preferably the central metal is zirconium, titanium or hafnium.

The molar concentration of the metallocene compound in the catalyst system ranges preferably from $10^{-5}$ to $10^{-2}$ mol/l more preferably from $10^{-4}$ to $10^{-2}$ mol/l.

A preferred class of metallocene compounds have the following formulas (I), (II) or (III).

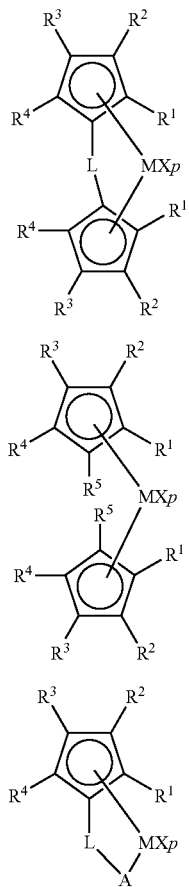

wherein

M is a transition metal belonging to group 4, 5 or to the lanthanide or actinide groups of the Periodic Table of the Elements; preferably M is zirconium, titanium or hafnium; the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl group, optionally containing one or more Si or Ge atoms; the substituents X are preferably the same and are preferably hydrogen, halogen, $R^6$ or $OR^6$; wherein $R^6$ is preferably a $C_1$-$C_7$ alkyl, $C_6$-$C_{14}$ aryl or $C_7$-$C_{14}$ arylalkyl group, optionally containing one or more Si or Ge atoms; more preferably, the substituents X are Cl or Me.

p is an integer equal to the oxidation state of the metal M minus 2; preferably p is 2;

L is a divalent bridging group selected from $C_1$-$C_{20}$ alkylidene, $C_3$-$C_{20}$ cycloalkylidene, $C_6$-$C_{20}$ arylidene, $C_7$-$C_{20}$ alkylarylidene, or $C_7$-$C_{20}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a divalent group $(ZR^7_m)_n$; Z being C, Si, Ge, N or P, and the $R^7$ groups, equal to or different from each other, being hydrogen or linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl groups or two $R^7$ can form a alifatic or aromatic $C_4$-$C_7$ ring;

more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;

$R^1$, $R^2$, $R^3$, $R^4$ and $R^5$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or two adjacent $R^1$, $R^2$, $R^3$, $R^4$ and $R^5$ form one or more 3-7 membered ring optional containing heteroatoms belonging to groups 13-17 of the periodic table; such as to form with the cyclopentadienyl moiety the following radicals: indenyl; mono-, di-, tri- and tetra-methyl indenyl; 2-methyl indenyl, 3-$^t$butyl-indenyl, 2-isopropyli-4-phenyl indenyl, 2-methyl-4-phenyl indenyl, 2-methyl-4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl- or N-phenyl-5,6-dihydroindeno[2,1-b]indol-6-yl; azapentalene-4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene.

A is a $NR^8$ group or an oxygen or sulfur atom, wherein the group $R^8$ is linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alklylaryl or $C_7$-$C_{20}$-arylalkyl radicals, optionally containing heteroatoms belonging to groups 13 or 15-17 of the Periodic Table of the Elements; preferably A is a $NR^8$ group wherein $R^8$ is selected from the group consisting of methyl, ethyl, n-propyl, isopropyl, n-butyl, t-butyl, phenyl, p-n-butyl-phenyl, benzyl, cyclohexyl and cyclododecyl; more preferably $R^8$ is t-butyl.

Non limiting examples of compounds belonging to formulas (I), (II) or (III) are the following compounds (when possible in either their meso or racemic isomers, or mixtures thereof):

dimethylsilanediylbis(indenyl)zirconium dichloride,
dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methylindenyl)zirconium dichloride,
dimethylsilanediylbis(2-methyl-4-isopropylindenyl)zirconium dichloride,
dimethylsilanediylbis(2,4-dimethylindenyl)zirconium dichloride,
dimethylsilanediylbis(2-methyl-4,5-benzoindenyl)zirconium dichloride,
dimethylsilanediylbis(2,4,7-trimethylindenyl)zirconium dichloride,
dimethylsilanediylbis(2,4,6-trimethylindenyl)zirconium dichloride,
dimethylsilanediylbis(2,5,6-trimethylindenyl)zirconium dichloride,
dimethylsilanediylbis (2-isopropyl-4-(4'-tert-butyl)-phenyIndenyl)(2,7-Methyl-4-(4'-tert-butyl)-Phenyl-Indenyl)-zirconium dichloride,
dimethylsilanediylbis (2-isopropyl-4-(4'-tert-butyl)-phenyIndenyl)(2-Methyl-4-(4'-tert-butyl)-Phenyl-Indenyl)-zirconium dichloride,
dimethylsilanediylbis (2-isopropyl-4-phenyl-Indenyl)(2-Methyl-4-Phenyl-Indenyl)-zirconium dichloride, methyl(phenyl)silanediylbis(2-methyl-4,6-diisopropylindenyl)-zirconium dichloride,
methyl(phenyl)silanediylbis(2-methyl-4-isopropylindenyl)-zirconium dichloride,
1,2-ethylenebis(indenyl)zirconium dichloride,
1,2-ethylenebis(4,7-dimethylindenyl)zirconium dichloride,
1,2-ethylenebis(2-methyl-4-phenylindenyl)zirconium dichloride,
1,2-ethylenebis(2-methyl-4,6-diisopropylindenyl)zirconium dichloride,
1,2-ethylenebis (2-methyl-4,5-benzoindenyl)zirconium dichloride,
dimethylsilanediyl(3-tert-butyl-cyclopentadienyl)(9-fluorenyl)zirconium dichloride,
dimethylsilandiylbis-6-(3-methylcyclopentadienyl-[1,2-b]-thiophene) dichloride;
dimethylsilandiylbis-6-(4-methylcyclopentadienyl-[1,2-b]-thiophene)zirconium dichloride;
dimethylsilandiylbis-6-(4-isopropylcyclopentadienyl-[1,2-b]-thiophene)zirconium dichloride;
dimethylsilandiylbis-6-(4-ter-butylcyclopentadienyl-[1,2-b]-thiophene)zirconium dichloride;
dimethylsilandiylbis-6-(3-isopropylcyclopentadienyl-[1,2-b]-thiophene)zirconium dichloride;
dimethylsilandiylbis-6-(3-phenylcyclopentadienyl-[1,2-b]-thiophene)zirconium dichloride;
dimethylsilandiylbis-6-(2,5-dichloride-3-phenylcyclopentadienyl-[1,2-b]-thiophene)zirconium dimethyl;
dimethylsilandiylbis-6-[2,5-dichloride-3-(2-methylphenyl)cyclopentadienyl-[1,2-b]-thiophene]zirconium dichloride;
dimethylsilandiylbis-6-[2,5-dichloride-3-(2,4,6-trimethylphenyl)cyclopentadienyl-[1,2-b]-thiophene]zirconium dichloride;
dimethylsilandiylbis-6-[2,5-dichloride-3-mesitylenecyclopentadienyl-[1,2-b]-thiophene]zirconium dichloride;
dimethylsilandiylbis-6-(2,4,5-trimethyl-3-phenylcyclopentadienyl-[1,2-b]-thiophene)zirconium dichloride;
dimethylsilandiylbis-6-(2,5-diethyl-3-phenylcyclopentadienyl-[1,2-b]-thiophene)zirconium dichloride;
dimethylsilandiylbis-6-(2,5-diisopropyl-3-phenylcyclopentadienyl-[1,2-b]-thiophene)zirconium dichloride;
dimethylsilandiylbis-6-(2,5-diter-butyl-3-phenylcyclopentadienyl-[1,2-b]-thiophene)zirconium dichloride;
dimethylsilandiylbis-6-(2,5-ditrimethylslyl-3-phenylcyclopentadienyl-[1,2-b]-thiophene)zirconium dichloride;
dimethylsilyl(tert-butylamido)(N-methyl-2-methyl-5,6-dihydroindeno[2,1-b]indol-6-yl)dimethyl titanium
dimethylsilyl(tert-butylamido)(N-methyl-2-methoxy-5,6-dihydroindeno[2,1-b]indol-6-yl)dimethyl titanium
dimethylsilyl(tert-butylamido)(N-methyl-2-methyl-1,8-dihydroindeno[2,1-b]pyrrol-6-yl)dimethyl titanium
dimethylsilyl(tert-butylamido)(N-methyl-2-methyl-1,8-dihydroindeno[2,1-b]pyrrol-6-yl) dimethyl titanium
dimethylsilyl(tert-butylamido)(N-ethyl-5,6-dihydroindeno[2,1-b]indol-6-yl)dimethyl titanium
dimethylsilyl(tert-butylamido)(2,5-dimethyl-7H-thieno[3',2':3,4]cyclopenta[1,2-b]thiophen-7-yl) dimethyl titanium
dimethylsilyl(tert-butylamido)(indenyl)dimethyl titanium
dimethylsilyl(tert-butylamido)(2-methyl-indenyl)dimethyl titanium dimethylsilyl{(2-methyl-1-indenyl)-7-(2,5-dimethyl-cyclopenta[1,2-b:4,3-b']-dithiophene)}zirconium dichloride
dimethylsilyl{(2,4,7-trimethyl-1-indenyl)-7-(2,5-dimethyl-cyclopenta[1,2-b:4,3-b']-dithiophene)}zirconium dichloride
dimethylsilyl{(2,4,6-trimethyl-1-indenyl)-7-(2,5-dimethyl-cyclopenta[1,2-b:4,3-b']-dithiophene)}zirconium dichloride as well as the corresponding dimethyl, chloromethyl, dihydro and $\eta^4$-butadiene compounds. Suitable metallocene complexes belonging to formulas (I), or (II) are described in WO 98/22486, WO 99/58539 WO 99/24446, U.S. Pat. No. 5,556,928, WO 96/22995, EP-485822, EP-485820, U.S. Pat. No. 5,324,800, EP-A-0 129 368, U.S. Pat. No. 5,145,819, EP-A-0 485 823, WO 01/47939, WO 01/44318 and PCT/EP02/13552.

Steps d) and c1) can be carried out according to the procedures known in the art. Preferably step d) or c1) is carried out by distilling the solution containing the catalyst system obtained in step b) or b1), the distillation can be carried out at atmospheric pressure or at reduced pressure in order to use lower distillation temperatures.

The total aluminium/metal molar ratio of the catalyst system obtainable according to the present invention ranges from 10:1 to 100000:1, preferably from 10:1 to 50000:1; more preferably from 10:1 to 10000:1; even more preferably from 50:1 to 1000:1.

The catalyst system obtainable according to the process of the present invention shows a high activity, referred to the amount of methylalumoxane employed, said activity being retained also if this catalyst is used after a long period of time and allows to obtain polymer having a molecular weight higher than a conventional toluene-containing catalyst system. Moreover by using said catalyst the presence of aromatic solvent is drastically reduced.

A further object of the present invention is a solution in an alifatic solvent having from 5 to 30 carbon atoms to be used as catalyst system for the polymerization of olefins comprising the reaction product of methylalumoxane, a organo-aluminium compound of formula $H_jAlU_{3-j}$ or $H_jAl_2U_{6-j}$, wherein U is described above and a metallocene compound.

A further object of the present invention is a process for polymerizing one or more olefins containing from 2 to 20 carbon atoms comprising the step of contacting one or more of said olefins in the presence of the catalyst system described above.

Examples of olefins containing from 2 to 20 carbon atoms, are alpha-olefins of formula $CH_2$=CHT wherein T is a hydrogen atoms or a $C_1$-$C_{18}$ alkyl radical, such as ethylene, propylene, 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-tadecene, 1-eicosene; cyclic olefins, and polyenes such as 1,5-hexadiene, 1-6-heptadiene, 2-methyl-1,5-hexadiene, butadiene, isoprene, trans 1,4-hexadiene, c is 1,4-hexadiene, 6-methyl-1,5-heptadiene, 3,7-dimethyl-1,6-octadiene, 11-methyl-1,10-dodecadiene, 5-ethylidene-2-norbornene.

The catalyst of the present invention is especially designed for the solution polymerization process, therefore a further object of the present invention is a solution polymerization process for polymerizing one or more olefins containing from 2 to 20 carbon atoms comprising the step of contacting one or more of said olefins in the presence of the catalyst system described above.

Preferred olefin to be used according to the process of the present invention are ethylene, propylene, 1-butene, 1-pentene, 1-hexene and 1-octene and mixtures thereof.

As reported above by using the catalyst system of the present invention a polymer having an high molecular weight can be obtained.

Therefore it is a further object of the present invention a 1-butene homopolymer having the following features:
(i) intrinsic viscosity measured in tetrahydronaphtalene (THN) at 135° C. higher than 2.5; preferably higher than 3
(ii) distribution of molecular weight Mw/Mn comprised between 2 and 4; preferably between 2 and 3; and
(iii) melting point comprised between 100° C. and II 5° C.; preferably between 100° C. and 110° C.

The following examples are reported for illustrative and not limiting purposes.

EXAMPLES

General Procedures and Characterizations

Chemicals.

All chemicals must be handled using standard Schlenk techniques. Methylalumoxane (MAO) was received from Albemarle as a 30% wt/vol toluene solution (d=0.83 g/cc) and used as such.

In the catalyst example C-5, the cocatalyst employed was MAO 10% wt/vol, used as received from Crompton AG (toluene solution 1.7 M in Al).

Pure triisobutylaluminum (TIBA) was used as such.

Isododecane was purified over alumina to reach a water content below 10 ppm.

A 101 g/L TIBA/isododecane solution was obtained by mixing the above components.

The melting points of the polymers ($T_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

Molecular weight parameters were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-hexene polymers or 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times10^{-4}$, dL/g and $K_{PB}=1.78\times10^{-4}$ dL/g for polystyrene and poly-1-butene respectively. The Mark-Houwink exponents a were assumed to be 0.706 for polystyrene and 0.725 for poly-1-butene. Even though, in this approach, the molecular parameters obtained were only an estimate of the hydrodynamic volume of each chain, they allowed a relative comparison to be made.

Rac dimethylsilyl{(2,4,7-trimethyl-1-indenyl)-7-(2,5-dimethyl-cyclopenta[1,2-b:4,3-b']-dithiophene)}zirconium dimethyl (A-1) was prepared according to the following procedure: the ligand, [3-(2,4,7-trimethylindenyl)][7-(2,5-dimethyl-cyclopenta[1,2-b:4,3-b']-dithiophene)]dimethyl silane, was prepared as described in WO 01/47939. 30.40 g of this ligand (72.26 mmol) and 170 ml of anhydrous THF were charged under nitrogen in a cilindrical glass reactor equipped with magnetic stirring bar. The brown solution so obtained was cooled and maintained at 0° C., while 58.4 ml of n-BuLi 2.5M in hexane (146 mmol) were added dropwise via dropping funnel. At the end of the addition, the dark brown solution was stirred for 1 hour at room temperature, then cooled to −50° C., and then 48.6 ml of MeLi 3.05 M in diethoxymethane (148.2 mmol) were added to it. In a Schlenk, 16.84 g of $ZrCl_4$ (72.26 mmol) were slurried in 170 ml of toluene. Both mixtures were kept at −50° C. and the $ZrCl_4$ slurry was quickly added to the ligand dianion solution. At the end of the addition, the reaction mixture was allowed to reach room temperature and stirred for an additional hour. A yellow-green suspension was obtained. $^1$H NMR analysis shows complete conversion to the target complex. All volatiles were removed under reduced pressure, and the obtained free flowing brown powder was suspended in 100 ml of $Et_2O$. After stirring for a few minutes, the suspension was filtered over a G4 frit. The solid on the frit was then washed twice with $Et_2O$ (until the washing solvent turns from brown to yellow), then dried under vacuum, and finally extracted on the frit with warm toluene (60° C.), until the filtering solution turns from yellow to colorless (about 650 ml of toluene); The extract was dried under reduced pressure to give 28.6 g of yellow powder, which $^1$H-NMR showed to be the target complex, free from impurities. The yield based on the ligand was 73.3%.

$^1$H-NMR: ($CD_2Cl_2$, r.t.), ppm: −2.09 (s, 3H), −0.79 (s, 3H), 1.01 (s, 3H), 1.04 (s, 3H), 2.38 (s, 3H), 2.39 (s, 3H), 2.43 (d, 3H, J=1.37 Hz), 2.52 (s, 3H), 2.57 (d, 3H, J=1.37 Hz), 6.61 (dq, 1H, J=7.04 Hz, J=0.78 Hz), 6.81 (q, 1H, J=1.37 Hz), 6.85 (dq, 1H, J=7.04 Hz, J=0.78 Hz), 6.87 (q, 1H, J=1.37 Hz), 6.91 (s, 1H).

Rac dimethylsilyl{(2,4,7-trimethyl-1-indenyl)-7-(2,5-dimethyl-cyclopenta[1,2-b:4,3-b']-dithiophene)}zirconium dichloride (A-2) was prepared according to WO 01/47939.

Preparation of Catalyst Systems

Example 1

Preparation of Catalyst System C-1

3.6 cc of TIBA/isododecane were mixed with 2.15 cc of the 10% MAO/toluene solution (MAO/TIBA, molar ratio 2:1). Then, 15 mg of A-1 were dissolved with this solution. The color of the resulting solution was red-violet. Distillation at reduced pressure and 50° C. was carried out until a volume of 2.12 cc was removed from the solution. The final solution was clear and dark-violet, without traces of solid. $Al_{tot}/Zr=200$; MAO/TIBA 2:1 mol/mol. This solution was used to perform 1-hexene polymerization, see Table 1.

Comparative Example 2

Preparation of Catalyst System C-2

This example was carried out as example 1 by using 13 mg of A-1 and 2.8 cc of MAO/toluene 10%. The mixing was carried out at room temperature, no distillation process was carried out. The resulting clear red-violet solution was used as such for 1-hexene polymerization after 10 min from its preparation. Al/Zr=200. This solution was used to perform 1-hexene polymerization, see Table 1.

Example 3

Preparation of Catalyst System C-3

9.7 cc of TIBA/isododecane solution were mixed with 1.9 cc of 30% MAO/toluene solution (MAO/TIBA, molar ratio 2:1). Then, 20 mg of A-1 were dissolved with this solution. The metallocene was completely soluble, the dark violet solution did not show any trace of residual solid. The final solution was obtained upon recovery of 2.0 cc by distillation. MAO/TIBA 2:1 mol/mol; $Al_{tot}/Zr=400$. This solution was used to perform 1-hexene polymerization, see Table 1.

Example 4

Preparation of Catalyst System C4

A catalytic solution was prepared using a 10 L jacketed stirred tank reactor equipped with a condenser. Under a nitrogen flow, 2300 g of a 110 g/L TIBA solution in isododecane and 790 mL of a 30% wt/wt MAO solution in toluene (Albemarle, d=0.83 g/mL) were loaded into the vessel and allowed to react for 1 hour under stirring at room temperature. After this time 13.5 g of A-1 was added to form the catalyst solution. The obtained purple solution was then diluted with further 1460 g of isododecane to reach the desired final concentration. The reactor temperature was increased up to 55° C. and the pressure reduced to 14 mbar-a using a vacuum pump to remove the toluene via distillation. In 3 hours, 660 cc was condensed of a mixture 75/25 mol/mol toluene/isododecane. The residual toluene in the catalytic solution was <1% wt. 3900 g of catalytic solution was obtained with the following analysis:

Al 3.4% wt, Zr 580 ppm with an Al/Zr molar ratio of 203 and a catalytic system (catalyst+cocatalyst) concentration of 107 g/L. This solution was used to perform 1-butene polymerization tests.

Comparative Examples 5

Preparation of Catalyst System C-5

The catalyst mixtures were prepared by dissolving A-2 with the proper amount of the MAO/toluene solution needed to achieve Al/Zr ratios of 200 and 500. The solutions were stirred for 10 min at room temperature before being used to perform 1-butene polymerization tests. The polymerization conditions and the characterization data of the obtained polymers are reported in Table 2.

Polymerization Tests

1-Hexene Polymerization, General Procedure.

To 20 g of liquid 1-hexene an amount of the catalyst solution obtained as reported above containing 0.5 mg of metallocene, is added at 50° C. After 30 minutes, the polymerization is stopped with ethanol. Then, acetone is added to separate the polymer. Finally, the polymer is dried at 50° C. under vacuum for several hours. In examples 3-6, polymerization tests were repeated after several days by using the same catalyst solution in order to test the change in activity. The results of the 1-hexene polymerization tests are reported in Table 1.

1-Butene Polymerization in Autoclave, General Procedure.

A 4-L jacketed stainless-steel autoclave autoclave, equipped with a magnetically driven stirrer and a Flow Record & Control system is used All fluxes, pressure and temperatures into the autoclave are controlled via DCS PC. Before each test, the autoclave is cleaned with hot nitrogen (1.5 barg $N_2$, 70° C., 1 hour). Then, 1350 g of 1-butene and 6 mmol of Al(i-Bu)$_3$ (as a 1M solution in hexane) are charged at room temperature. Then, the autoclave is thermostated at the polymerization temperature, the solution containing the catalyst/cocatalyst mixture is injected into the autoclave through a stainless-steel vial by means of nitrogen pressure. In example 13300 ml of hydrogen are injected into the autoclave before the injection of the catalyst solution. The polymerizations are carried out at constant temperature for 1 h. Then, stirring is interrupted, and the pressure into the autoclave is raised to 20 bar-g with nitrogen. The 1-butene/poly-1-butene mixture is discharged from the bottom into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. Intinsic viscosity (I.V.) of the polybutenes were measured in THN at 135° C.

The polymer obtained in example 9 was characterized it has an I.V. of 3.05; the distribution of molecular weight (Mw/Mn) of 2.8 and a melting point (Tm$_2$) of 103° C.

TABLE 1

1-hexene polymerization results.

| Ex | Cat. | Ageing, days | Yield, g | Activity Kg/g$_{met}$h | Activity Kg/g$_{totsolid}$h | Activity Kg/g$_{MAO}$h | Mw, GPC | Mn, GPC |
|---|---|---|---|---|---|---|---|---|
| 1 | C-1 | 0 | 11.4 | 45.6 | 2.1 | 1.2 | 355049 | 128232 |
| 2* | C-2 | 0 | 10.4 | 41.5 | 1.9 | 1.1 | 236433 | 76258 |
| 3 | C-3 | 1 | 13.46 | 53.8 | 2.45 | 1.4 | n.a. | n.a. |
| 4 | | 4 | 12.63 | 50.5 | 2.30 | 1.3 | n.a. | n.a. |
| 5 | | 11 | 11.4 | 45.6 | 2.07 | 1.2 | n.a. | n.a. |
| 6 | | 14 | 12.7 | 50.8 | 2.31 | 1.3 | n.a. | n.a. | n.a. not available

*comparative

By comparing the performance of the catalyst system of example 1 and comparative example 2, it results that polymer of higher molecular weights can be obtained by using the catalytic solutions prepared according to the present invention. Moreover, Example 3 shows that the catalytic activity remains substantially unchanged upon ageing.

TABLE 2

1-butene polymerization data.

| Ex | Cat. | mg[+] | Al(MAO)/ Zr | $T_{pol}$ | Yield (g) | activity kg/(gMAO*h) | I.V. (dL/g, THN) |
|---|---|---|---|---|---|---|---|
| 7* | C-5 | 2 | 500 | 60 | 130 | 1.3 | 2.37 |
| 8* | C-5 | 2 | 500 | 80 | 100 | 1.0 | 1.33 |
| 9 | C-4 | 2.7 | 135 | 60 | 119 | 3.3 | 3.04 |
| 10 | C-4 | 2.7 | 135 | 70 | 140 | 3.9 | 2.45 |
| 11 | C-4 | 2.7 | 135 | 80 | 137 | 3.8 | 1.64 |
| 12# | C-4 | 1.35 | 135 | 70 | 159 | 8.8 | 1.19 |

[+]mg of metallocene compound used.
*comparative.
300 ml of H2 were added.

By comparing the polymerization results of comparative examples in which the catalyst system is solubilized in toluene with those according to the invention, it is evident that, as found in the 1-hexene polymerizations, the increasing of the polymer molecular weights represents an advantage of the present catalyst formulation. Moreover the activity of the catalyst system of the invention is higher than that of the prior art (comparative examples 7-9).

The invention claimed is:

1. A catalytic solution obtained by a process comprising the following steps:
   (a) contacting a solution of methylalumoxane (MAO) in an aromatic first solvent with a solution in a second solvent comprising at least one alumoxane different from methylalumoxane or at least one organo-aluminium compound of formula $H_jAlU_{3-j}$ or $H_jAl_2U_{6-j}$, where the U substituents, same or different, are hydrogen atoms, halogen atoms, or hydrocarbon group containing from 2 to 20 carbon atoms, optionally containing silicon or germanium atoms, with the proviso that at least one U is different from halogen and at least one U is different from hydrogen, and j ranges from 0 to 1, being also a non-integer number;
   (b) adding to the solution formed in step a, an alifatic third solvent having a boiling point higher than the aromatic first solvent and second solvent provided the second solvent is an aromatic solvent or the second solvent has a boiling point lower than the aromatic first solvent;
   (c) solubilizing a metallocene compound in the solution obtained in step a or in step b; and
   (d) substantially removing aromatic solvents, thereby forming a final solution having a molar concentration of the metallocene compound and a content of aromatic solvents;
   wherein the content of the aromatic solvents in the final solution obtained in step d) is lower than 2% by weight, the molar concentration of the metallocene compound in the final solution obtained in step d) ranges from $1 \cdot 10^{-5}$ to $1 \cdot 10^{-1}$ mol/l, and a molar ratio between methylalumoxane and the organo-aluminium compound or a molar ratio between methylalumoxane and the alumoxane used in step a) ranges from 10:1 to 1:10.

2. A catalyst solution obtained with a process comprising the following steps:
   a1) contacting a solution of methylalumoxane in an aromatic first solvent with a solution of at least one organo-aluminium compound of formula $H_jAlU_{3-j}$ or $H_jAl_2U_{6-j}$ in an alifatic third solvent having a boiling point higher than the aromatic first solvent, where the U substituents, same or different, are hydrogen atoms, halogen atoms, or hydrocarbon groups containing from 2 to 20 carbon atoms, optionally containing silicon or germanium atoms, with the proviso that at least one U is different from halogen and from hydrogen, and j ranges from 0 to 1, being also a non-integer number;
   b1) solubilizing a metallocene compound in the solution obtained in step a1); and
   c1) substantially removing the aromatic first solvent thereby forming a final solution,
   wherein the content of the aromatic first solvent in the final solution obtained in step c1) is lower than 2% by weight, a molar concentration of the metallocene compound in the final solution obtained in step c1) ranges from $1 \cdot 10^{-5}$ to $1 \cdot 10^{-1}$ mol/l, and a molar ratio between methylalumoxane and the organo-aluminium compound ranges from 10:1 to 1:10.

3. The catalyst solution according to claim 1 wherein in the organo-aluminium compound of formula $H_jAlU_{3-j}$ or $H_jAl_2U_{6-j}$, U is a linear or branched $C_1$-$C_{20}$-alkyl radical.

4. The catalyst solution according to claim 1 wherein the aromatic first solvent has from 6 to 12 carbon atoms.

5. The catalyst solution according to claim 1 wherein the second solvent is an alifatic solvent having from 5 to 30 carbon atoms.

6. The catalyst solution according to claim 5 wherein the second solvent is isododecane, isohexadecane, or isoeicosane.

7. The catalyst solution according to claim 1 wherein the second solvent has a boiling point higher than 110° C.

8. The catalyst solution according to claim 1 wherein step d) is carried out by distilling the solution containing the catalyst system obtained in step b).

9. A process for polymerizing at least one olefin containing from 2 to 20 carbon atoms comprising the step of contacting the at least one olefin in the presence of a catalyst system obtained by a process comprising the following steps:
   (a) contacting a solution of methylalumoxane (MAO) in an aromatic first solvent with a solution in a second solvent comprising at least one alumoxane different from methylalumoxane or at least one organo-aluminium compound of formula $H_jAlU_{3-j}$ or $H_jAl_2U_{6-j}$, where the U substituents, same or different, are hydrogen atoms, halogen atoms, or hydrocarbon group containing from 2 to 20 carbon atoms, optionally containing silicon or germanium atoms, with the proviso that at least one U is different from halogen and at least one U is different from hydrogen, and j ranges from 0 to 1, being also a non-integer number;
   (b) adding to the solution formed in step a, an alifatic third solvent having a boiling point higher than the aromatic first solvent and the second solvent provided the second solvent is an aromatic solvent or the second solvent has a boiling point lower than the aromatic first solvent;
   (c) solubilizing a metallocene compound in the solution obtained in step a or in step b; and
   (d) substantially removing aromatic solvents, thereby forming a final solution having a molar concentration of the metallocene compound and a content of aromatic solvents;
   wherein the content of the aromatic solvents in the final solution obtained in step d) is lower than 2% by weight, the molar concentration of the metallocene compound in the final solution obtained in step d) ranges from $1 \cdot 10^{-5}$ to $1 \cdot 10^{-1}$ mol/l, and a molar ratio between methylalumoxane and the organo-aluminium compound or a molar ratio between methylalumoxane and the alumoxane used in step b) ranges from 10:1 to 1:10.

10. The process of claim 9 wherein the polymerization process is a solution polymerization process.

11. The polymerization process according to claim 9 wherein, said olefins are alpha-olefins of formula $CH_2\!=\!CHT$ wherein T is a hydrogen atoms or a $C_1$-$C_{18}$ alkyl radical.

12. The catalyst solution according to claim 2 wherein in the organo-aluminium compound of formula $H_jAlU_{3-j}$ or $H_jAl_2U_{6-j}$, U is a linear or branched $C_1$-$C_{20}$-alkyl radical.

13. The catalyst solution according to claim 2 wherein the first aromatic solvent has from 6 to 12 carbon atoms.

14. The catalyst solution according to claim 2 wherein the second solvent is an alifatic solvent having from 5 to 30 carbon atoms.

15. The catalyst solution according to claim 14 wherein the second solvent is isododecane, isohexadecane, or isoeicosane.

16. The catalyst solution according to claim 2 wherein the second solvent has a boiling point higher than 110° C.

17. The catalyst solution according to claim 2 wherein step c1) is carried out by distilling the solution containing the catalyst system obtained in step b1).

* * * * *